March 27, 1956 J. A. LAMPMAN 2,739,350
METHOD AND MEANS OF MOLDING
Filed Jan. 28, 1952 3 Sheets-Sheet 1

INVENTOR:
James A. Lampman
By Herbert E. Metcalf
HIS PATENT ATTORNEY

March 27, 1956     J. A. LAMPMAN     2,739,350
METHOD AND MEANS OF MOLDING

Filed Jan. 28, 1952     3 Sheets-Sheet 2

INVENTOR:
James A. Lampman
By Herbert E. Metcalf
HIS PATENT ATTORNEY

March 27, 1956 — J. A. LAMPMAN — 2,739,350
METHOD AND MEANS OF MOLDING
Filed Jan. 28, 1952 — 3 Sheets-Sheet 3

INVENTOR:
James A. Lampman
By Hubert E. Metcalf
HIS PATENT ATTORNEY

United States Patent Office 2,739,350
Patented Mar. 27, 1956

2,739,350

METHOD AND MEANS OF MOLDING

James A. Lampman, Inglewood, Calif., assignor to Northrop Aircraft, Inc., Hawthorne, Calif., a corporation of California Application January 28, 1952, Serial No. 268,482

7 Claims. (Cl. 18—45)

The present invention relates to molding, and more particularly to a novel method and means of molding hollow ducts.

In one specific embodiment, the present invention is directed to a method and means of forming hollow ducts of plasticized glass fiber cloth for use in airplanes to transmit air from a source such as a ram air intake for example, to other regions of the airplane to be used for air conditioning and cooling purposes.

It has been the usual practice in the manufacture of such ducts to apply sheets or mats of glass fiber cloth which have been impregnated with a plastic binder of the thermosetting group such as polyester resin for example, around a preformed plaster breakaway mold and exerting pressure against the exterior of the applied material to force the material against the mold, and at the same time, preferably curing the assembly in a curing oven. When the cure has been completed, the plaster mold is usually broken up inside the formed duct and removed by compressed air or other well-known means. Further scraping and cleaning is usually necessary to make certain that no plaster is left clinging to the inside of the finished duct which could loosen to cause damage later when the duct is installed in an airplane.

In many instances certain duct designs are very complex, involving compound curves and often running from a circular opening of a certain size at one end thereof to a rectangular opening of a different size at the other end as will be described and shown later. Moreover, in most instances the ducts used in an airplane require a substantial degree of accuracy. Plaster breakaway molds of this type are relatively costly to make; usually being hand formed and finished to relatively close tolerances. As is well known, plaster breakaway molds are usable for one application only; there being no practical way of removing the mold intact from the finished part.

Among the objects of the present invention is to provide a method and means of molding irregularly shaped hollow ducts wherein the mold can be easily removed intact from a finished article and reused, under normal circumstances, without rework.

Another object of the present invention is to provide a production mold of complex configuration which can be reused without losing its original shape and dimensions.

Still another object of the invention is to provide a method and means for molding hollow ducts for airplanes wherein the danger of particles of plaster being left in the formed duct is eliminated.

Other objects and advantages will be seen as the description continues.

Briefly, in one preferred form, the method of present invention comprises the steps of: applying a thermosetting plastic material to the exterior surface of a preformed interior mold which is preferably made of a material from the thermoplastic group, at a temperature where the thermoplastic interior mold is normally firm; enclosing the material covered mold inside of a rigid exterior mold; pressurizing the interior mold to maintain the mold in a rigid state; curing the applied plastic material while the interior mold is pressurized; removing the pressure from the interior mold when the cure is completed; removing the exterior mold; and removing the interior mold from the formed part at a temperature where the interior mold is thermoelastic and capable of being deformed for easy removal.

The present invention will be further clarified by referring to the accompanying drawings wherein.

Figure 1:
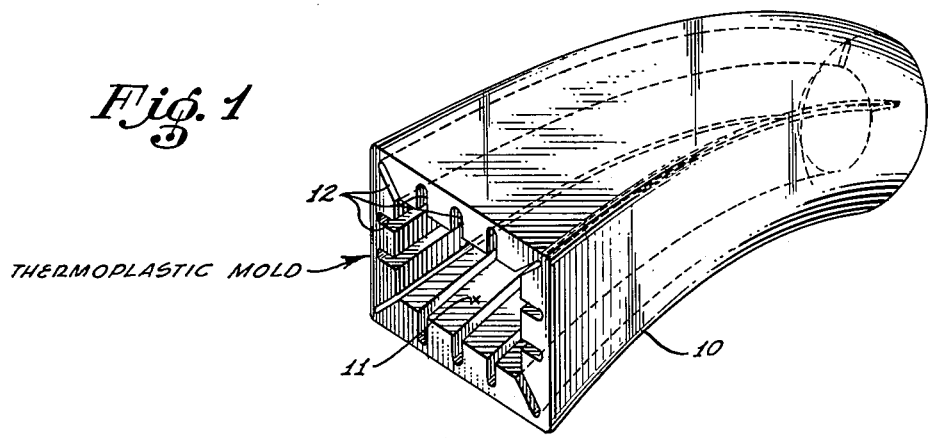
Figure 1 is a diagrammatic view in perspective of one preferred type of interior mold used in practicing the method of the present invention.

The preferred mode of practicing the method of the present invention is illustrated in the drawings wherein the article to be molded is a hollow duct of longitudinal curvature having a rectangular opening at one end thereof which gradually develops into a circular opening of reduced size at the other end thereof.

A preformed interior mold 10, as shown in Figure 1, is preferably made of a material from the thermoplastic group such as vinyl plastisol for example, which is well known to be normally firm; having a Shore durometer hardness reading of 40–50 at room temperature, i. e., 77° F.; and which is relatively pliable and elastic with a Shore durometer hardness reading of 20–30 at elevated temperatures around 270° F. The mold 10 is provided with a cavity 11 which extends coaxially therethrough. The cavity 11, having generally the same configuration as the exterior of the mold 10, is provided with a number of deep flutes 12 which are open at each end of the cavity 11 and extend longitudinally therethrough. The flutes 12 are preferably evenly spaced around the cavity 11 and extend laterally from the axis of the cavity 11 toward the outer surface of the mold 10 and terminate at a point where a comparatively thin section of material is left between the outer surface of the mold 10 and the bottoms of the flutes 12 so that a greater degree of flexibility of the mold 10 is achieved. Prior to the application of material to the mold 10, the exterior of the mold 10 can be given a coating of any well-known releasing agent to prevent the material from abnormally adhering thereto.

Figure 2:
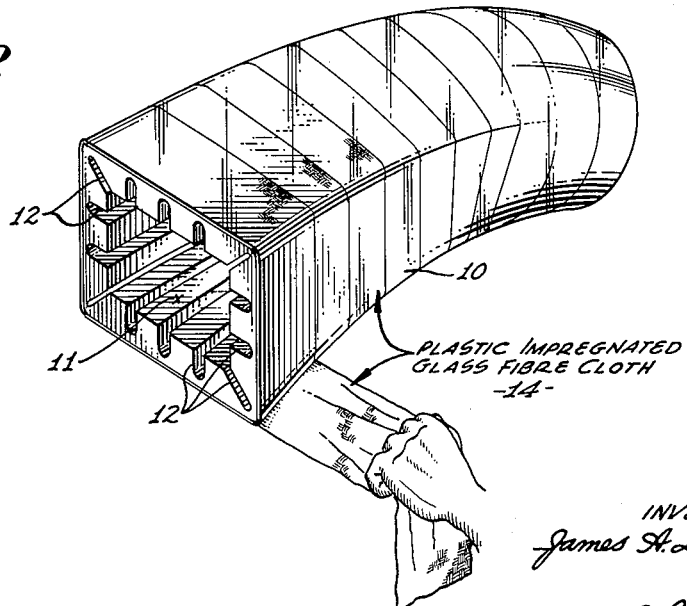
Figure 2 is a perspective view of the mold of Figure 1 being wrapped with plasticized glass fiber cloth.

In Figure 2, one preferred method of applying the duct material is shown wherein a strip 14 of glass fiber cloth or mat which has been treated with a thermosetting plastic binder such as polyester resin for example, is spirally wrapped around the mold 10, beginning at one end thereof and winding the strip 14 tightly with each turn thereof overlapping the preceding turn as shown.

Figure 3:
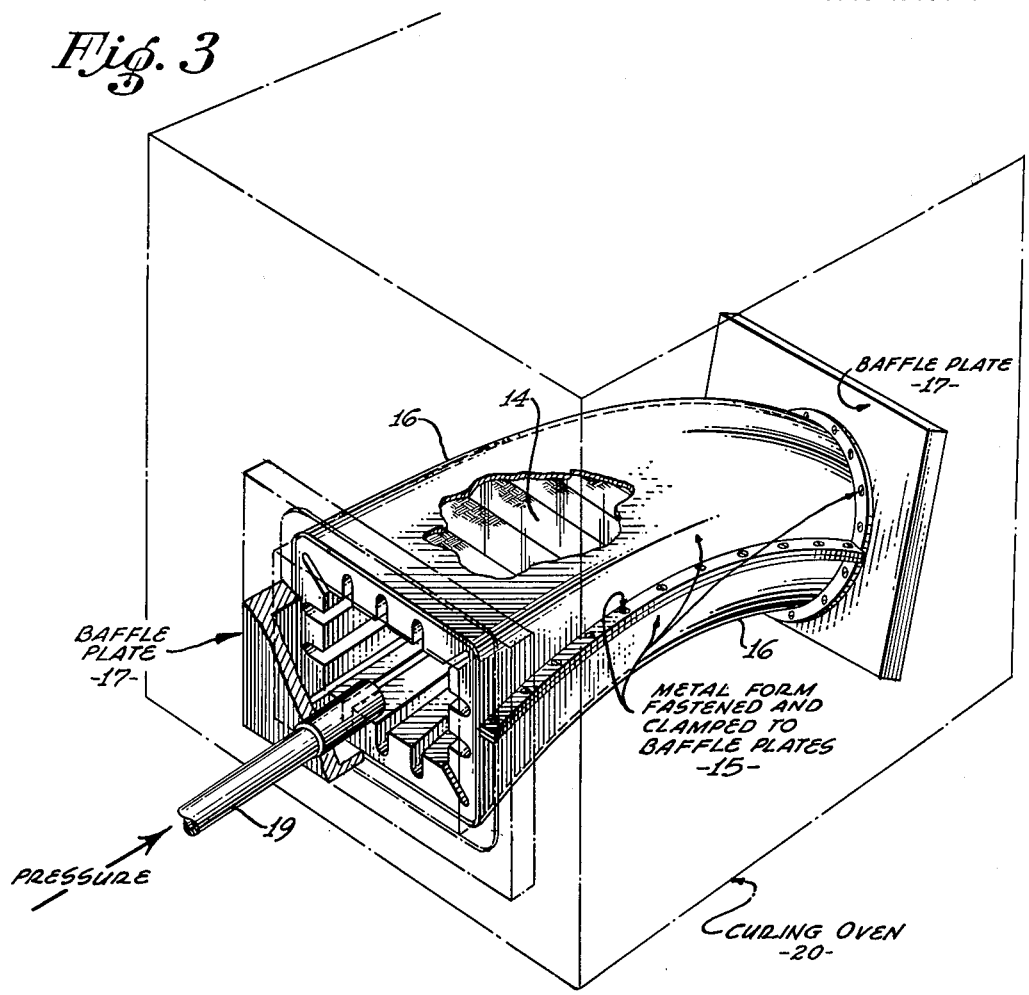
Figure 3 is a diagrammatic view in perspective of the mold of Figures 1 and 2 enclosed in an exterior mold and being cured in a curing oven under pressure. The exterior mold is cut away to show the wrapping of the plasticized glass fiber cloth.

In cases where the material is applied by wrapping as illustrated in the present example, the best results will be achieved if the mold is rigid. Maximum rigidity of the mold 10 can be reached by reducing the temperature of the mold 10 to a temperature well below room temperature to obtain a Shore durometer hardness reading of 70–80, as by freezing for example. In this manner, possible distortion of the mold 10 by the tight wrapping of material is held within allowable limits. After application of the material 14 to the interior mold is completed, the mold 10 is preferably incased in a rigid exterior mold 15 which may comprise, for example, a pair of mating elements 16 which are adapted to be bolted together as shown in Figure 3. Each end of the mold assembly is preferably tightly sealed by a baffle plate 17. Fluid pressure is introduced into the cavity 11 through a duct 19 in one of the baffle plates 17 to pressurize the interior mold 10; the pressure being maintained therein at a sufficient value to hold the interior mold 10 in a rigid state while the curing of the applied material 14 is completed, as in a conventional curing oven 20 for example.

Figure 4:
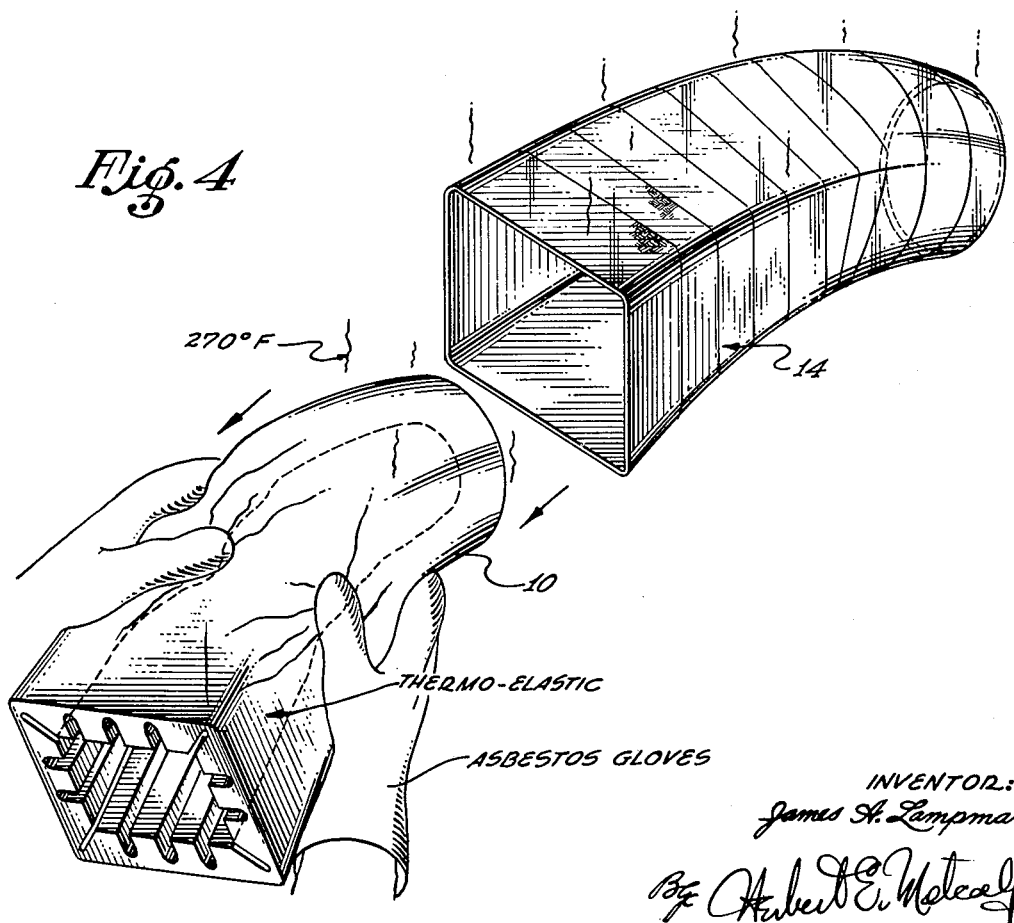
Figure 4 is a perspective view showing the interior mold of Figures 1, 2, and 3 being removed from the formed part.

When the curing is completed, the pressure is withdrawn and the exterior mold 15 removed. For the best results, the interior mold 10 is removed at a temperature range of around 270° F.; the mold 10 still being sufficiently thermoelastic to be easily deformed for removal from the cured article as shown in Figure 4. A further aid for easy removal of the interior mold can be effected by applying suction to the baffle plate duct 19 before removing the exterior mold 15 to collapse the interior mold 10 away from the formed part. In this manner the interior mold 10 will not be as apt to adhere to the duct wall due to the pressures used during the curing step.

Figure 5:
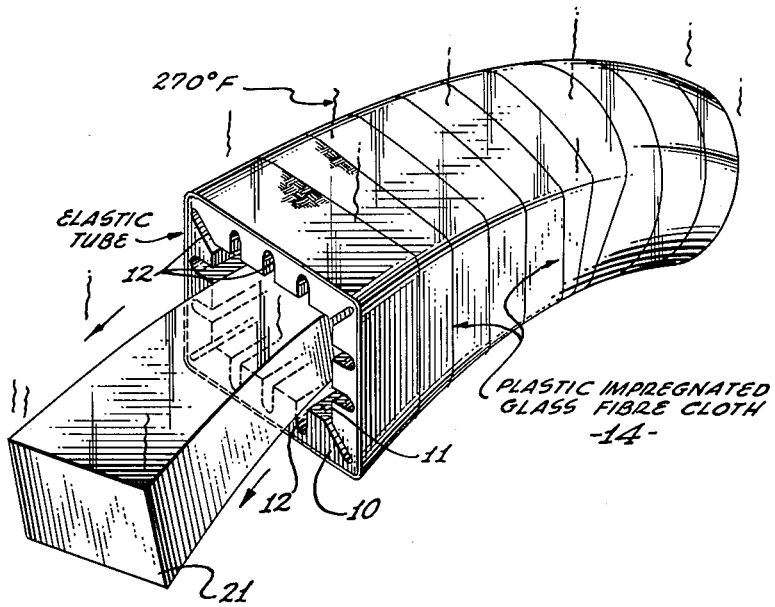
Figure 5 is a diagrammatic view in perspective of the wrapped interior mold wherein a solid core of thermoplastic material is used to make the interior mold more rigid during the application of material thereto.

Another means by which the interior mold 10 can be made even more rigid is shown in Figure 5 wherein a solid core 21 of thermoplastic material which is formed to a sliding fit with the mold cavity 11, is inserted into the cavity 11 of the interior mold 10 and retained therein during procedure illustrated in the previous figures. Having the same physical characteristics as the interior mold 10, the solid core 21 is also normally firm at room temperature or below, and can be made even more rigid by lowering the temperature. Like the interior mold 10, the core 21 is thermoelastic at elevated temperatures and can be easily deformed for removal. The solid core 21, when used as shown, further reduces the possibility of distortion of the interior mold 10 during the application of material 14 thereto and during the handling of the mold 10 prior to curing.

It can be seen that, with the use of the rigid core 21, when pressure is introduced into the cavity 11 through the baffle plate 17 (not shown in this particular figure) the pressure will enter each flute 12 thereby pressurizing the interior mold 10 around the core 21 to produce the same rigidity as in the previous example.

The solid core 21 is easily removed at an elevated temperature or curing temperature after completion of the cure of the applied material 14; the subsequent removal of the interior core 10 following as before. While the present example describes and shows the use of one form of exterior mold 15, baffle plates 17, and pressure introduction 19 means, other means equally capable of accomplishing the same result will occur to those skilled in the art.

It has thus been shown that the novel method and means of the present invention provides a number of distinct advantages over previously known molding methods and is ideally suitable for economically mass-producing hollow ducts and the like. Moreover, complex ducts wherein the dimensions are more or less critical can be faithfully reproduced to exacting specifications using the same molds; spoilage and rejections of finished parts being held to a bare minimum.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. Means for molding a hollow duct of complex configuration, comprising a recoverable interior mold of the desired exterior shape for receiving a quantity of plastic material having less than a complete cure applied to the exterior of said mold, said interior mold being made of a temperature controllable material having the properties of being normally firm at room temperature, thermoelastic at temperatures higher than room temperature, and relatively rigid at temperatures lower than room temperature, said material being applied to said mold at said low temperature where said mold is rigid, a rigid exterior mold enclosing said interior mold, and pressurizing means for maintaining said interior mold rigid while said material is cured at a relatively high temperature, whereby said interior mold can be easily deformed for recovery at a temperature between said curing temperature and room temperature where said mold is thermoelastic.

2. Means for molding a hollow duct of complex configuration, comprising a recoverable interior mold of a desired exterior shape for receiving a quantity of plastic material having less than a complete cure, said interior mold being made of a temperature controllable material having the properties of being normally firm at room temperature, thermoelastic at temperatures higher than room temperature, and relatively rigid at relatively low temperatures, a cavity in said interior mold, a core generally fitting said cavity of said interior mold and made of a material having the same properties as that of said interior mold, said plastic material being applied to the exterior of said interior mold at said low temperature where said mold and said core are rigid, a rigid exterior mold enclosing said interior mold, and means for pressurizing said interior mold to form said material between said exterior mold and interior mold while said material s cured at said high temperature, whereby said core can be removed from said cavity of said interior mold, and said interior mold can be easily deformed for recovery from the cured material at a temperature where said mold and core are thermoelastic.

3. Means for molding a hollow duct of complex configuration, comprising a recoverable preformed interior mold having a desired exterior shape to receive a quantity of thermosetting material having less than a complete cure, said mold being made of a thermosensitive material having the properties of being normally firm at room temperature, relatively rigid at low temperatures, and thermoelastic at curing temperature of said thermosetting material, a cavity extending coaxially through said interior mold and open on at least one end thereof, a plurality of flutes extending longitudinally through said cavity, the depth of said flutes extending radially outwardly to terminate at a point in the section of said mold where a relatively thin mold wall section separates the exterior of said mold from the bottoms of said flutes to thereby render said mold wall more deformable at said curing temperatures, a core generally fiitting said mold cavity and made of a material having the same properties as said interior mold, a rigid exterior mold, sealing means for enclosing the ends of said interior mold and exterior mold during molding of said thermosetting material, and means for introducing pressure through said sealing means to pressurize said interior mold cavity while said thermosetting material is cured, whereby said core and said interior mold can be easily recovered from said thermosetting material at a temperature intermediate said curing temperature and room temperature after said thermosetting material has been formed and cured.

4. The method of forming a hollow duct of complex configuration, which comprises modeling an interior mold into the desired duct configuration using a temperature sensitive material having the properties of being normally firm at room temperature, relatively rigid at low temperatures, and thermoelastic at high temperatures, applying a quantity of thermosetting material over the exterior of said mold at a temperature below room temperature where said mold is rigid, raising the temperature of said material on said mold to a high temperature sufficient to heat cure said thermosetting material, stiffening said mold to maintain the original shape thereof while said thermosetting material is being heat cured, and recovering said mold intact at a temperature where said mold is thermoelastic and capable of being sufficiently deformed for removal from said cured and formed material without deformation of said formed material.

5. The method of forming a hollow duct of complex configuration, which comprises modeling a hollow interior mold into the desired duct configuration using a temperature sensitive material having the properties of being normally firm at room temperature, relatively rigid at low temperatures, and thermoelastic at high temperatures, wrapping a layer of thermosetting material around the exterior of said mold at a temperature below room temperature where said mold is rigid, raising the temperature of said material on said mold to a high temperature sufficient to heat cure said thermosetting material, inserting a rigid core into said mold to maintain the original shape thereof while said thermosetting material is being heat cured, removing said core after said material is heat cured, and recovering said mold intact at a temperature where said mold is thermoelastic and capable of being sufficiently deformed for removal from said cured and formed material without deformation of said formed material.

6. The method of forming a hollow duct of complex configuration, which comprises modeling a hollow interior mold into the desired duct configuration using a temperature sensitive material having the properties of being normally firm at room temperature, relatively rigid at low temperatures, and thermoelastic at high temperatures, applying a quantity of thermosetting material over the exterior of said mold at a temperature below room temperature where said mold is rigid, raising the temperature of said material on said mold to a high temperature sufficient to heat cure said thermosetting material, pressurizing the hollow interior of said mold to maintain the original shape thereof while said thermosetting material is being heat cured, and recovering said mold intact at a temperature where said mold is thermoelastic and capable of being sufficiently deformed for removal from said cured and formed material without deformation of said formed material.

7. The method of forming a hollow duct which comprises forming a mold having an exterior desired configuration out of a material that is relatively rigid at low temperatures and relatively elastic at high temperatures; which comprises lowering the temperature of said mold until the mold is sufficiently rigid to withstand substantial compressive stresses, wrapping a strip of fabric together with a binder tightly around said rigid mold thereby imposing substantial compressive stresses thereon without deforming said mold, solidifying said binder to bond the turns of said strip, and elevating the temperature of said mold and wrapped strip to a point where said mold is sufficiently elastic to be removed from said mold intact, and removing said mold intact from the formed wrapped tape without deforming said wrapped bonded tape.

References Cited in the file of this patent

UNITED STATES PATENTS

| | | |
|---|---|---|
| 720,718 | Maddock et al. | Feb. 17, 1903 |
| 1,740,144 | Barrett | Dec. 17, 1929 |
| 1,999,525 | Morscholz | Apr. 30, 1935 |
| 2,345,977 | Howald et al. | Apr. 4, 1944 |
| 2,411,542 | Ilch | Nov. 26, 1946 |
| 2,449,526 | Dunne et al. | Sept. 14, 1948 |
| 2,525,070 | Greenwald et al. | Oct. 10, 1950 |
| 2,531,394 | Campbell | Nov. 28, 1950 |
| 2,653,887 | Slayter | Sept. 29, 1953 |